(12) United States Patent
Ericson (10) Patent No.: US 10,710,173 B2
(45) Date of Patent: Jul. 14, 2020

(54) SLOT MILLING DISC, A SLOT MILLING TOOL COMPRISING A SLOT MILLING DISC AND A DISC FOR A MILLING DISC

(71) Applicant: SANDVIK INTELLECTUAL PROPERTY AB, Sandviken (SE)

(72) Inventor: Ronald Ericson, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/766,127

(22) PCT Filed: Oct. 7, 2016

(86) PCT No.: PCT/EP2016/073981
§ 371 (c)(1),
(2) Date: Apr. 5, 2018

(87) PCT Pub. No.: WO2017/060415
PCT Pub. Date: Apr. 13, 2017

(65) Prior Publication Data
US 2018/0290218 A1 Oct. 11, 2018

(30) Foreign Application Priority Data
Oct. 9, 2015 (EP) .................................... 15189072

(51) Int. Cl.
*B23Q 11/00* (2006.01)
*B23C 5/08* (2006.01)
(Continued)

(52) U.S. Cl.
CPC .................. *B23C 5/08* (2013.01); *B23C 5/26* (2013.01); *B23C 5/28* (2013.01); *B23C 2210/161* (2013.01)

(58) Field of Classification Search
CPC ........... B23C 5/28; B23C 5/08; B23C 5/1054; B23C 5/63; B23C 5/72; B23Q 11/10; B23Q 11/1015; B23Q 11/1023
See application file for complete search history.

(56) References Cited

U.S. PATENT DOCUMENTS 3,597,817 A * 8/1971 Whalley ............... B23C 5/1054
407/11
4,333,371 A * 6/1982 Matsuda .............. B23D 59/025
83/169
(Continued)

FOREIGN PATENT DOCUMENTS

CN         201960145 U    9/2011
DE         3105933 A1     8/1982
(Continued)

*Primary Examiner* — Alan Snyder
(74) *Attorney, Agent, or Firm* — Corinne R. Gorski (57) ABSTRACT

A slot milling disc has an outer peripheral surface provided with a number of cutting edges, an attachment arrangement allowing rotary preventing attachment of the slot milling disc to a rotatable mounting shaft and at least one flushing fluid channel having a confined cross-section and extending within the milling disc from an inlet opening located in a central part of the disc and configured to be connected to a source of flushing fluid to at least one outlet opening in the peripheral surface of the disc. The flushing fluid channel has an inner channel portion extending from the inlet opening towards the peripheral surface and ending before reaching the peripheral surface and at least one outer channel portion extending from the inner channel portion while changing direction of the flushing fluid channel and extending to the at least one outlet opening.

15 Claims, 4 Drawing Sheets

(51) Int. Cl.
*B23C 5/26* (2006.01)
*B23C 5/28* (2006.01)

(56) References Cited

U.S. PATENT DOCUMENTS

| | | | | |
|---|---|---|---|---|
| 4,516,560 | A * | 5/1985 | Cruickshank | B23D 61/025 |
| | | | | 125/15 |
| 5,290,135 | A * | 3/1994 | Ball | B23F 21/22 |
| | | | | 407/11 |
| 5,340,248 | A | 8/1994 | Enbergs | |
| 6,595,727 | B2 * | 7/2003 | Arvidsson | B23C 5/006 |
| | | | | 407/35 |
| 7,497,153 | B2 * | 3/2009 | Brunton | B23D 59/02 |
| | | | | 407/11 |
| 9,676,043 | B2 * | 6/2017 | Lehto | B23C 5/28 |
| 10,137,549 | B2 * | 11/2018 | Koik | B23Q 11/1046 |
| 2006/0288993 | A1 * | 12/2006 | Baratta | B23D 59/025 |
| | | | | 125/13.01 |
| 2012/0198671 | A1 | 8/2012 | Meidar et al. | |
| 2013/0236253 | A1 * | 9/2013 | Malka | B23B 27/086 |
| | | | | 407/11 |
| 2017/0252839 | A1 * | 9/2017 | Donisi | B23C 5/08 |

FOREIGN PATENT DOCUMENTS

| | | |
|---|---|---|
| DE | 10145006 A1 | 4/2003 |
| EP | 2929967 A1 | 10/2015 |
| FR | 1115922 A | 5/1956 |
| JP | S5713120 U | 1/1982 |
| JP | H0167006 U | 4/1989 |
| JP | H0631579 A | 2/1994 |

* cited by examiner

SLOT MILLING DISC, A SLOT MILLING TOOL COMPRISING A SLOT MILLING DISC AND A DISC FOR A MILLING DISC

RELATED APPLICATION DATA

This application is a § 371 National Stage Application of PCT International Application No. PCT/EP2016/073981 filed Oct. 7, 2016 claiming priority to EP 15189072.0 filed Oct. 9, 2015.

TECHNICAL FIELD OF THE INVENTION

The present invention relates to a slot milling disc, a slot milling tool having a slot milling disc and a disc for such a slot milling disc.

"Means configured to allow rotary preventing attachment of the slot milling disc to a rotatable mounting shaft" is to be interpreted to cover means of a separate disc making it possible to attach it to a rotatable mounting shaft, such as by for instance tightening of screws, as well as means creating a permanent attachment of the disc to a rotatable mounting shaft, such as obtained by welding or by making the slot milling disc and the mounting shaft in one single piece.

When machining a metal work piece by means of a rotating milling disc, it is often advantageous or even necessary to flush the work piece and/or the milling disc with a flushing fluid in the form of a gas or a liquid or a mixture of gas and liquid. Such flushing can be performed for different reasons, e.g. for cooling or lubricating purpose or for washing away cuttings or chips from the work piece during machining. The present invention is mainly but not solely directed to the problem of washing away cuttings or chips from the work piece during machining, which is particularly delicate when creating narrow slots, i.e. slots with a small width, by a slot milling disc.

A common way to achieve flushing of a slot milling disc is to simply direct a stream of liquid and/or gas from the outside towards the milling disc and the work piece at an area where the actual machining takes place. Flushing of such milling discs with a flushing fluid for purpose of cooling, lubricating and/or flushing away chips, performed by means of one or more flushing fluid jets directed towards the milling disc and the work piece from the outside is ineffective, in particular in deep slotting and for flushing away cuttings or chips, because the outside jet in general cannot reach the relative deep parts of such narrow slots during the slot or groove milling operation. Hence, the flushing will be very ineffective as most of the fluid will not reach the area where it could be of use. In case of a liquid flushing medium this will also result in a formation of a large amount of waste liquid, which has to be collected and filtered or disposed of.

BACKGROUND ART

DE 10145006 discloses a slot milling disc comprising an integrated disc-shaped portion and a hub-formed portion, which is arranged at the centre of the disc-shaped portion and which is adapted to be connected to a rotatable shaft at a bearing surface having a recess or spline at the rear end of the hub portion. The disc has coolant channels having a confined cross section and extending radially within the milling disc to outlet openings in the bottom of chip spaces separating adjacent projections in the peripheral surface of the disc provided with cutting inserts. The coolant channels provide an efficient cooling of the cutting inserts when this is needed during operation of the slot milling disc. The slot milling disc may however be improved in terms of evacuation of cuttings or chips, especially when cutting comparatively narrow and deep slots in a work piece.

The main challenge in slot or groove milling is usually chip evacuation. Chip issues often harm production efficiency, lower component quality or cause tool breakage, especially when milling narrow and deep slots/grooves.

There are slot milling discs being formed as thin discs having a thickness of only about 2-10 mm, which around their outer peripheries are provided with a number of cutting edges and which are primarily used for cutting grooves in various work pieces. On one of their side surfaces these discs have a bearing surface closest to their centre axis which is arranged to be facing and clamped towards a mounting surface in an end of a rotatable mounting shaft. The still unpublished European patent application No.14164374.2 discloses a slot milling disc in which the attachment means is configured to force a bearing surface of the disc towards a mounting surface at an end surface of a mounting shaft and flushing fluid channels having a confined cross-section extend within the milling disc from an inlet opening in the bearing surface to an outlet opening in the peripheral surface of the disc located in a chip space in the form of a concaveness in the peripheral surface between adjacent projections which are each provided with a cutting edge. This means that flushing fluid jets may also for thin such discs, which may be used to mill deep slots/grooves, be directed to reach into such slots/grooves without any risk of hitting the work piece beside the slot/groove machined, so that the efficiency of the flushing will be substantially improved with respect to flushing fluid jets directed towards the milling disc and the work piece from the outside.

SUMMARY OF THE INVENTION

The object of the present invention is to provide a slot milling disc being improved in at least some aspect with respect to such slot milling discs already known.

This object is according to the invention obtained by providing such a slot milling disc with the disclosed features.

Thus, the at least one flushing fluid channel of the slot milling disc according to the invention comprises an inner channel portion extending from the inlet opening towards the peripheral surface and ending before reaching this "Ending before reaching this" also covers the case that this inner channel portion has been part of a channel portion extending all the way to the peripheral surface and which has then been plugged by suitable means.

The at least one flushing fluid channel comprises also an outer channel portion extending from the inner channel portion while changing direction of the flushing fluid channel in such a manner as to be inclined in a direction towards a cutting edge and extending to the at least one outlet opening. The presence of this additional outer channel portion and the change of direction of the flushing fluid channel obtained thereby enables a direction of a flushing fluid jet towards a part of a slot being produced by the slot milling disc in operation which results in an efficient evacuation of cuttings or chips from the slot in the case of a narrow and deep slot. This provides improved production efficiency, higher surface finish on the slots/grooves and more predictable tool life on the slot milling disc.

According to an embodiment of the invention the inner and outer channel portions have rectilinear extensions, which facilitate the production of the channels by for instance electrical discharge machining (EDM) or wire electrical discharge machining (WEDM).

According to another embodiment of the invention the outer channel portion makes an angle of ≥30°, 60°-120° or 85°-95° with the inner channel portion. Such a substantial change of the direction of the flushing fluid coming from the inlet opening of the flushing fluid channel means a corresponding change of the location hit by the flushing fluid jet compared to the case would the flushing fluid channel only have said inner channel portion and this reach to the outlet opening, so that a said location resulting in an improved efficiency of a flushing action primarily with respect to removal of cuttings and chips may be chosen.

According to another embodiment of the invention the outer channel portion extends from the inner channel portion in a direction opposite to the intended rotation direction of the disc towards a rake surface of a cutting edge. It has been found that such a direction of a flushing fluid jet results in a particularly efficient removal of cuttings and chips during the slot milling resulting in higher production efficiency, improved surface finish and predictable tool life. The cooling action of a flushing fluid jet directed to the rake surface of the cutting edge where the cutting action is carried out will then also be improved.

According to another embodiment of the invention the at least one outer channel portion extends from the inner channel portion in a direction of the intended rotation direction towards a clearance side of a cutting edge. Such a direction of flushing fluid may also provide efficient chip evacuation from the slots resulting in higher production efficiency, improved surface finish and predictable tool life. The cooling action of a flushing fluid jet directed to the clearance side of the cutting edge where the cutting action is carried out will then also be improved.

According to another embodiment of the invention the flushing fluid channel includes both a first outer channel portion inclined toward the rake surface of a cutting edge and a second outer channel portion inclined towards the clearance side of another cutting edge. In other words, each cutting edge can be provided with flushing fluid directed towards the cutting region from above as well as below, whereby the flushing action is focused towards a cutting zone of each cutting edge. This provides an efficient flushing of chips out of deep and narrow slots. In addition it also provides an efficient cooling of the cutting edge.

According to another embodiment of the invention the outer peripheral surface has a number of blade projections each provided with a cutting edge, a chip space in the form of a concaveness in the peripheral surface is arranged between each blade projection, and an inner channel portion extends from said central part into each blade projection towards an outer tip thereof. Such an extension of the inner channel portion makes it easy to produce by suitable means from the outer tip of each blade projection and the same applies for producing the outer channel portion which may be branched from the inner channel portion at a suitable location along the extension of the inner channel portion in the blade projection. According to a further embodiment of the invention this is also the case, and a first outer channel portion does then open by an outlet opening in the chip space located behind the blade projection as seen in the intended rotation direction of the disc and directed towards a rake surface of the cutting edge.

According to another embodiment of the invention the at least one flushing fluid channel comprises a second outer channel portion branched from the inner channel portion in another direction than the first outer channel portion and directed towards the clearance side of a cutting edge. The presence of this second outer channel portion and the direction thereof towards the clearance side of a cutting edge results in a further improvement of cooling and removal of cuttings and chips by flushing fluid supplied to the inlet opening of the flushing fluid channel.

According to another embodiment of the invention the second outer channel portion extends to an outlet opening in the tip of the blade projection in the vicinity of and behind the cutting edge of the blade projection as seen in the intended rotation direction of the disc.

According to another embodiment of the invention the inlet opening comprises at least one elongated opening, and this elongated opening is according to another embodiment of the invention arch shaped. An advantageous flow distribution can thereby be achieved between several flushing fluid channels having their inlet openings connected to a single arch shaped opening. Hence, two or more flushing fluid channels may open into a common elongated arch shaped inlet opening according to another embodiment of the invention.

According to another embodiment of the invention each elongated arch shaped inlet opening has a centre of curvature concentric with a centre axis of the disc.

According to another embodiment of the invention the entire slot milling disc is made in one piece, preferably with the exception of the cutting edges being provided by separate cutting inserts being mounted in insert seats arranged at the peripheral surface of the slot milling disc.

According to another embodiment of the invention the cutting edges of the disc are designed to cut a slot in a work piece with a width of 1.5-8 mm or 2-6 mm. A slot milling disc according to the invention is particularly favourable with respect to removal of cuttings and chips produced in operation of a milling disc producing such narrow slots.

According to another embodiment of the invention the disc has a first side surface having a bearing surface around a centre axis of the disc and a second side surface opposite to the first side surface, the attachment means is configured to interact with mating attachment means of a rotatable mounting shaft while forcing the bearing surface towards a mounting surface at an end surface of the shaft, and the milling disc has the inlet opening of the at least one flushing fluid channel in its bearing surface. These features are present in the slot milling disc disclosed in the European patent application No 14164374.2 discussed above and have the advantages mentioned therein. Accordingly, this facilitates the manufacturing as well as the mounting of the slot milling disc.

According to another embodiment of the invention the means for rotary preventing attachment of the slot milling disc to a rotatable mounting shaft is realised by a fixed connection of the disc to the shaft, such as by welding or by being made in one piece therewith. Such a fixed connection of the disc to the shaft is preferred for slot milling discs with smaller diameters, such as for instance below 80 mm. In other words, such a fixed or integrated shaft can be made with smaller diameter, whereby deeper slots can be milled, since the shaft and disc doesn't require additional space for screw connections between the shaft and the disc.

The invention also relates to a slot milling tool and a disc for a slot milling disc according to the corresponding appended claims directed thereto. The advantages of such a slot milling tool and disc appear clearly from the above discussion of the slot milling disc according to the invention and the embodiments thereof.

Other advantageous features as well as advantages of the present invention appear from the description following below.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figures 1, 2:
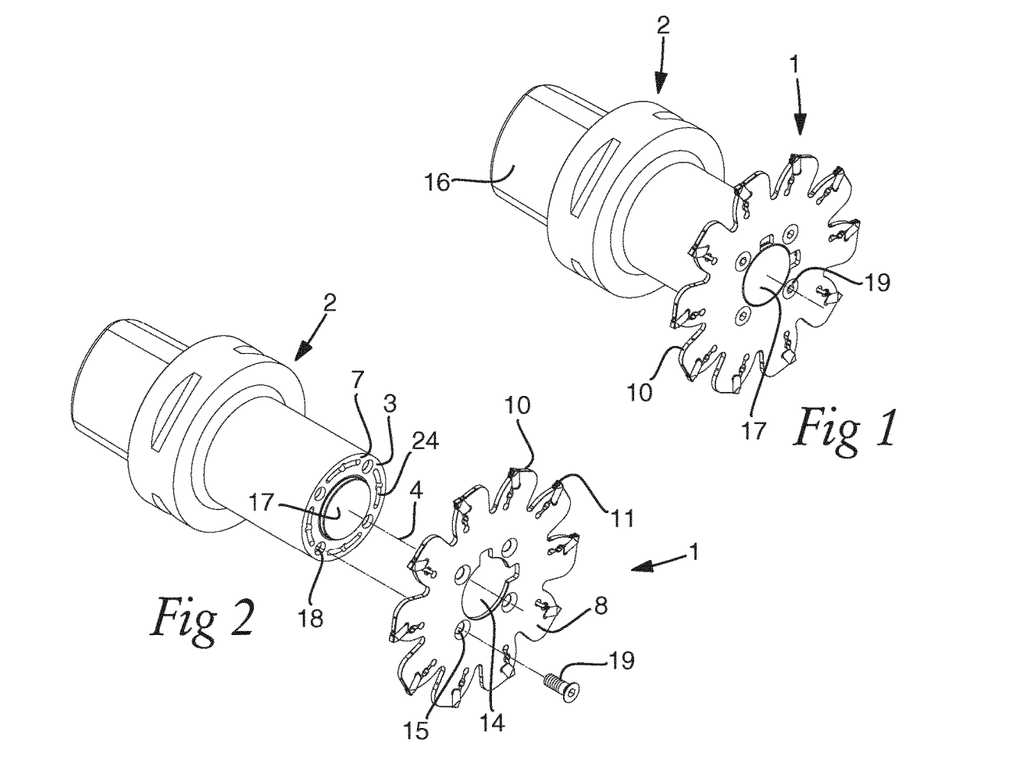
FIG. 1 is a perspective view obliquely from the front and from above of a slot milling disc according to a first embodiment of the invention mounted onto an end surface of a rotatable shaft.
FIG. 2 is an exploded perspective view according to FIG. 1 with the slot milling disc removed from the shaft.
Figure 3:
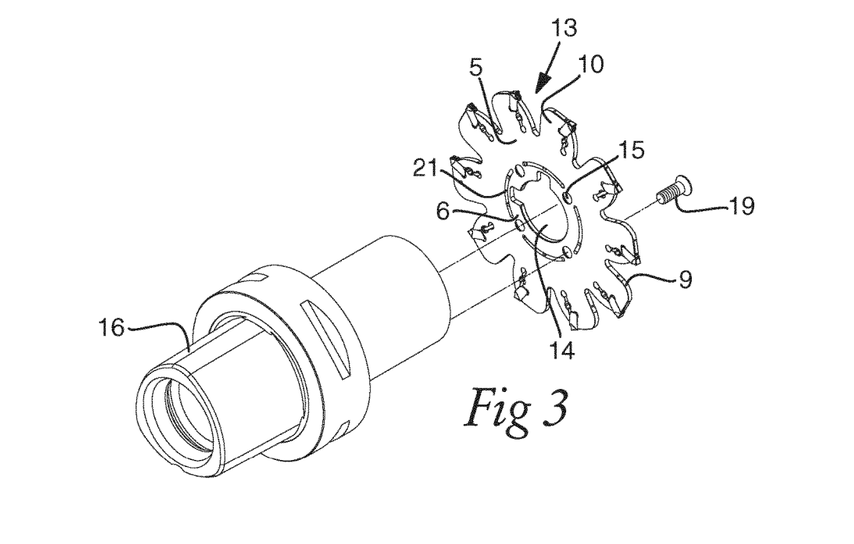
FIG. 3 is an exploded perspective view of the embodiment according to FIG. 1 as seen obliquely from behind and above.

A slot milling disc 1 according to a first embodiment of the invention will hereinafter be described by reference made to FIGS. 1-6 of the drawings. Hence, the slot milling disc is a slot or groove milling cutter, which is used to cut slots or grooves of a uniform width in a work piece. FIG. 1 shows the slot milling disc 1 mounted onto an end surface 3 of a rotatable shaft 2, whereas the slot milling disc 1 is in FIG. 2 removed from the rotatable shaft such that the end surface 3 of the shaft is visible.

The slot milling disc 1 comprises a thin and flat disc body with a centre axis 4 and having a first side 5 with a bearing surface 6 adapted to bear against a mounting surface 7 on the end surface 3 of the shaft, and a second surface 8 adapted to be facing away from the shaft in the mounted state. The disc has an overall circular shape typically with a diameter of 80-320 mm and with an n-fold (in this case 10-fold) rotational symmetrical outer peripheral surface 9 having a number of parting and/or grooving blade projections 10, wherein each blade projection is in the vicinity of its tip provided with a recess in which a cutting insert 11 having a cutting edge 12 is mounted. The cutting inserts 11 are in the illustrated embodiments formed as parting and/or grooving inserts adapted to be used for cutting off or making slots/grooves in a work piece and are each provided with a comparatively long insert body having the cutting edge extending in the direction of the thickness of the disc when mounted therein. Each cutting insert 11 is mounted in a seat with a clamping finger for securing it in the seat of the slot milling disc. These cutting inserts are provided with a width of 1.5-8 mm, preferably 2-6 mm, and are designed for cutting action in the feed direction. The cutting edges 12 of the inserts 11 are somewhat wider than the thickness of the slot milling disc in order to ensure clearance of the disc from the work piece in the slot during cutting, such as for instance a 2 mm cutting insert width in case of a slot milling disc thickness of 1.5 mm. The inserts may be manufactured from cemented carbide, or other hard/wear resistant material, such as high speed steel or ceramics. Such cutting inserts are also known for parting and/or grooving within the art of turning. Between each two adjacent blade projections 10 is formed a concaveness which is utilised as a chip space 13 in which cut chips are allowed to be formed/collected during cutting operation. The milling disc is also provided with a centre hole 14 and attachment means in the form of four screw holes 15 distributed around the centre hole.

The rotatable shaft 2 is in the form of an adapter, which is intended for being mounted to an undisclosed machine for rotating the slot milling disc. More precisely, in the end to be attached to the machine, the adapter is provided with a quick coupling, Capto™, disclosed in U.S. Pat. No. 5,340,248, comprising a conical and hollow shaft 16 having a somewhat "triangular", non-circular cross-section, which can be engaged by a pull rod not shown inside the shaft and drawn into a hole correspondingly shaped in the machine. In the other end, to which the slot milling disc is to be mounted, the shaft is cylindrical and it is in the end surface 3 to be mounted towards the slot milling disc 1 provided with a projecting centre hub 17 and a surrounding mounting surface 7 adapted to abut the bearing surface 6 of the disc. The shaft also comprises attachment means in the form of four screw holes 18 with internal threads for mounting screws 19. When mounting the milling disc 1 to the shaft 2 the disc is positioned against the end surface 3 of the shaft, such that the centre hub 17 of the shaft is positioned within the centre hole 14 of the disc and mounting screws 19 having screw heads are passed through the screw holes 15 of the disc and thread into the screw holes 18 of the shaft as illustrated in FIG. 1. By tightening the screws 19 the bearing surface 6 of the disc is forced to a close contact against the mounting surface 7 of the shaft.

Figure 4:
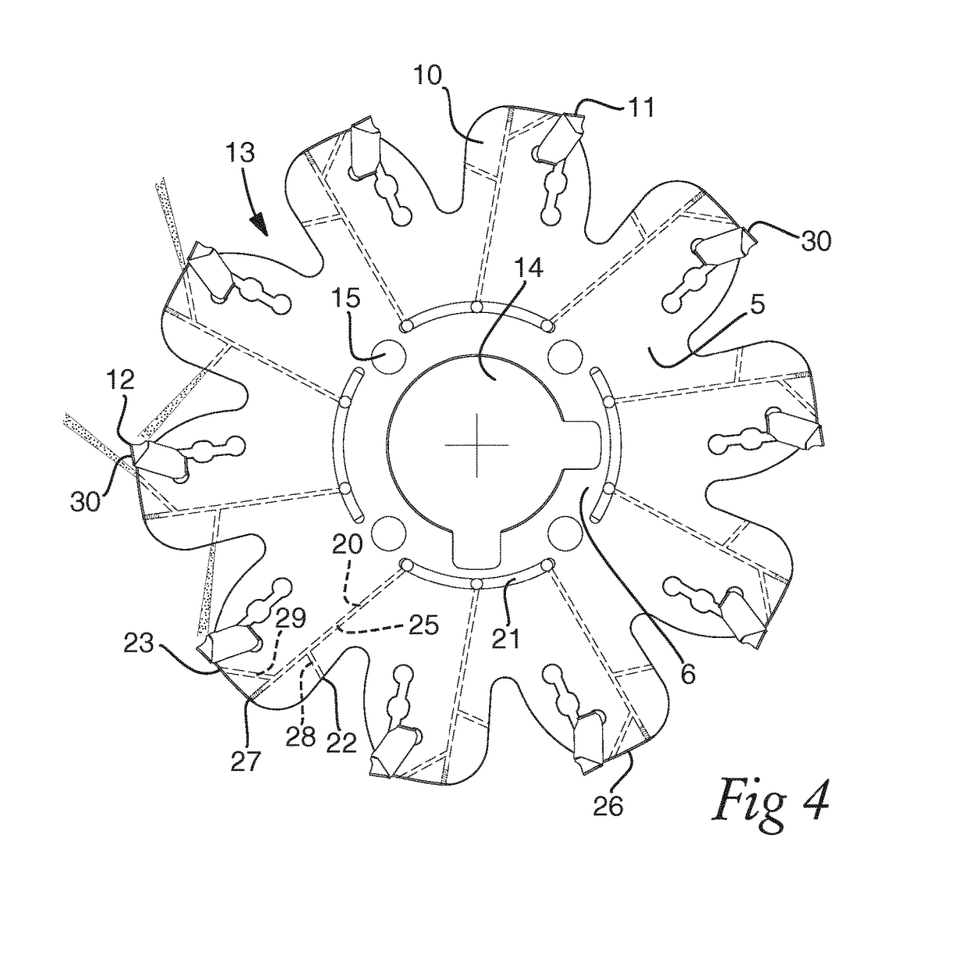
FIG. 4 is a side view of a first side of the milling disc according to the first embodiment in which the internal flushing fluid channels are indicated by dashed lines.

FIG. 4 illustrates how the slot milling disc according to this embodiment is designed in order to allow efficient flushing with fluid in the form of liquid and/or gas of the machined groove for washing away chips, cooling and/or lubrication during cutting operation. The disc is provided with as many flushing fluid channels 20 as blade projections 10 and cutting inserts 11. Each flushing fluid channel has a confined cross-section and extends within the milling disc from an inlet opening 21 in a central part within said bearing surface 6 of the disc to two outlet openings 22, 23 in the peripheral surface of the disc. The inlet openings are formed as four elongated arch shaped or curved openings 21 which each correspond in shape and position to a curved opening 24 in the mounting surface 7 on the shaft. Each flushing fluid channel has an inner channel portion 25 extending from the inlet opening 21 into the blade projection 10 and to the outer tip 26 thereof, where it is plugged by a sealing member 27. The flushing fluid channel has also a first outer channel portion 28 branched from the inner channel portion at a location within the blade projection 10 while making an angle with the inner channel portion close to 90° and directed in a direction opposite to the intended rotation direction of the disc while pointing towards a rake surface of a cutting edge 12.

Each flushing fluid channel has also a second outer channel portion 29 branched from the inner channel portion 25 in another direction than the first outer channel portion and directed towards the clearance side 30 of a cutting edge.

The outlet opening 23 of the second outer channel portion is located in the tip of the blade projection 10 in the vicinity of and behind the cutting edge 12 of the blade projection as seen in the intended rotation direction of the disc.

The different channel portions of the flushing fluid channel have typically a diameter of 0.5 mm-1.1 mm with a diameter of the inner channel portion typically somewhat larger than the diameter of the first and second outer channel portion. The three channel portions of a flushing fluid channel all extending through a blade projection 10 may easily be produced, for instance through electrical discharge machining (EDM) or wire electrical discharge machining (WEDM).

The jets of flushing fluid exiting the flushing fluid channel through the outlet openings 22, 23 of the first and second outer channel portions will efficiently remove cuttings and chips formed during a slot milling operation also when producing narrow slots. The first outer channel portion 28 directed towards a rake surface of a cutting edge will be particularly efficient in this respect. These narrow slots may for instance have a width of 2 6 mm and a depth of 20-120 mm.

Figure 5:
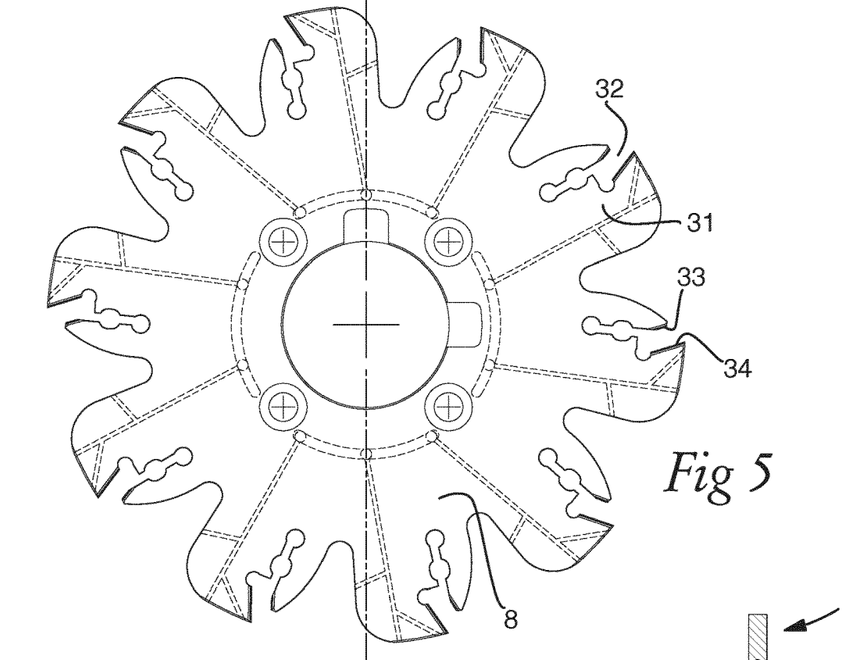
FIG. 5 is a view of a second side of the disc body for a slot milling disc according to FIG. 4.

FIG. 5 is a view corresponding to FIG. 4 of a disc 31 for a slot milling disc provided with a number of seats 32 for receiving cutting inserts at an outer peripheral surface thereof. This disc is designed to form a slot milling disc according to FIG. 4 by introducing cutting inserts into the seats 32 while forcing opposite walls 33, 34 of the seat apart for holding a cutting insert with a cutting edge width slightly exceeding the thickness of the disc 31 clamped under pretension therein.

Figure 6:
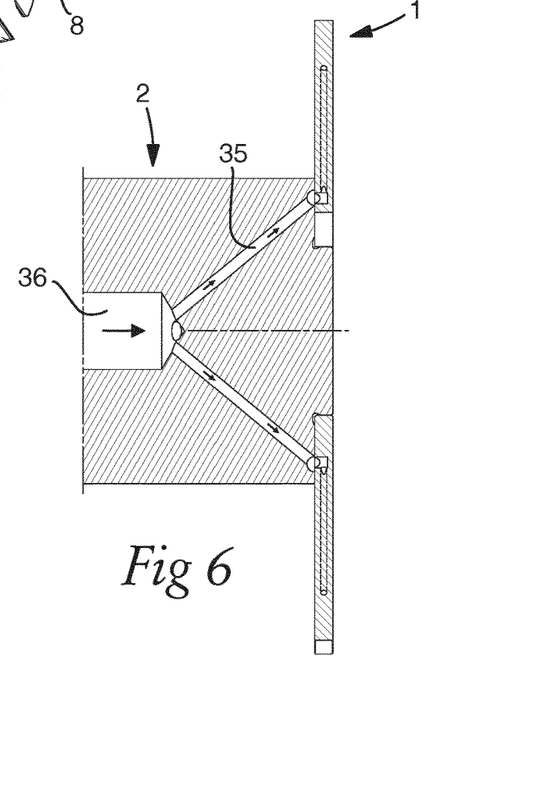
FIG. 6 is a cross-section along the line VI-VI in FIG. 5.

FIG. 6 shows how branching channels 35 extend obliquely from a central fluid channel 36 of the mounting shaft 2 toward each feeding opening 24 adjacent to the outer periphery of the shaft end to be arranged flush with the inlet openings 21 in the disc 1.

Figures 7, 8:
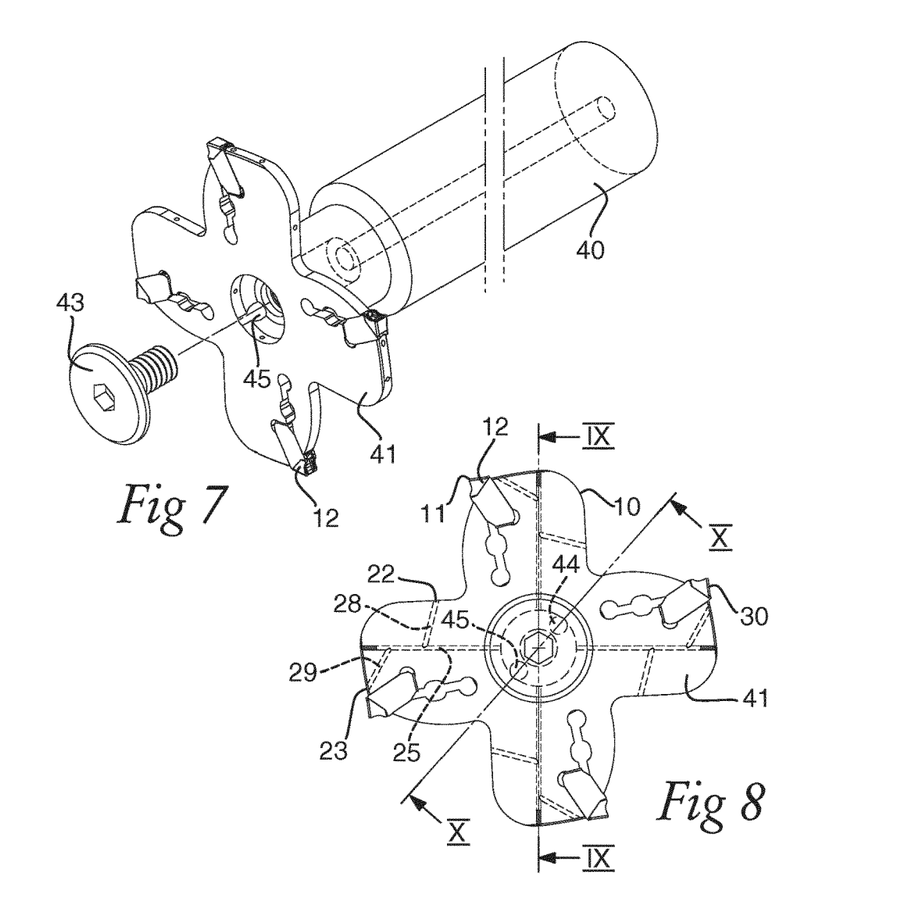
FIG. 7 is a perspective view of a slot milling disc according to a second embodiment of the invention.
FIG. 8 is a side view of the slot milling disc shown in FIG. 7.
Figure 9:
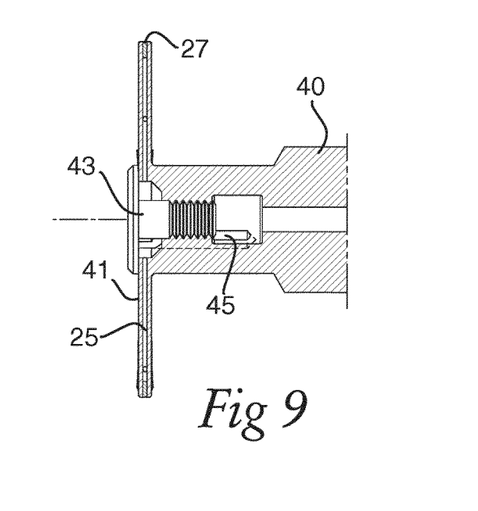
FIG. 9 is a cross-section along the line IX-IX in FIG. 8.
Figure 10:
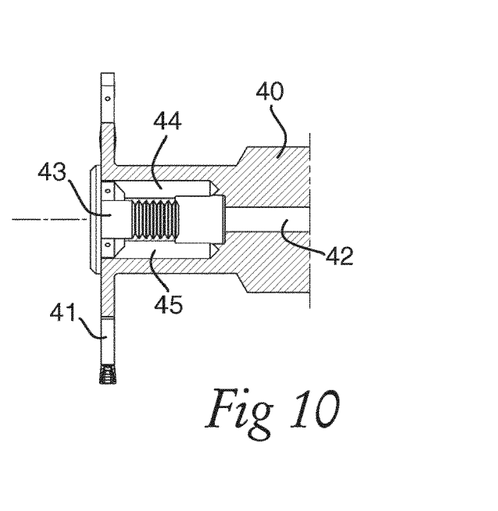
FIG. 10 is a cross-section along the line X-X in FIG. 8.

FIG. 7 illustrates schematically a slot milling disc according to a second embodiment of the invention, which differs from the slot milling disc according to the first embodiment by having a shaft 40 made in one piece with a milling disc 41. The central fluid channel 42 extends in this embodiment through the entire shaft 40 and through the disc 41 and has then been appropriately plugged through a screw 43 for diverting fluid coming from this central fluid channel 42 into the respective flushing fluid channels, which have the same appearance as the inner, first and second outer channel portions as in the first embodiment of the invention. As can be seen this embodiment also differs in that the milling disc has a 4-fold rotational symmetrical design including four blade projections. This embodiment is suited for discs with smaller diameters. The plugging screw 43 is in FIG. 7 shown in an extracted state and in FIGS. 8-10 engaging inner threads in the central fluid channel 42 for plugging this and only allowing flushing fluid to pass the screw by the two short bypass channel portions 44, 45 connecting the inner channel portions 25 of the four flushing fluid channels to the central fluid channel 42.

The invention is of course not restricted to the embodiments thereof described above, but many possibilities to modifications thereof would be apparent to a person with skill in the art without departing from the scope of the invention as defined in the appended claims.

The flushing fluid channels of the slot milling disc may beside the inner channel portion have only one of the first and second outer channel portions, and the first outer channel portion would then in most cases be preferred. The channel portions branched from the inner channel portion may make other angles than shown in the Figs for hitting the disc or slot machined at the desired cutting zone location of each cutting edge.

It is also possible that a separate inlet opening is provided in the disc for each flushing fluid channel.

The invention claimed is:

1. A slot milling disc comprising:
an outer peripheral surface provided with a plurality of cutting edges, wherein the slot milling disc is made in one piece, the cutting edges being provided by separate cutting inserts mounted in insert seats arranged at the outer peripheral surface;
an attachment arrangement configured to prevent rotary movement between the slot milling disc and a rotatable mounting shaft; and
at least one flushing fluid channel having a confined cross-section and extending within the milling disc from an inlet opening located in a central part of the disc and configured to be connected to a source of flushing fluid and to at least one outlet opening in the outer peripheral surface of the disc, wherein the at least one flushing fluid channel includes an inner channel portion extending from the inlet opening towards the outer peripheral surface and ending before reaching the outer peripheral surface, and a first outer channel portion extending from the inner channel portion in a direction opposite to a direction of intended rotation of the disc, while changing direction of the flushing fluid channel in such a manner as to be inclined towards a rake surface of a respective cutting edge and extending to the at least one outlet opening, and a second outer channel portion extending from the inner channel portion in the direction of the intended rotation direction towards and inclined to a clearance side of another cutting edge.

2. The slot milling disc according to claim 1, wherein the inner channel portion and the first and second outer channel portions have rectilinear extensions.

3. The slot milling disc according to claim 1, wherein the first and second outer channel portions makes an angle of ≥30° with the inner channel portion.

4. The slot milling disc according to claim 1, wherein the outer peripheral surface has a plurality of blade projections each provided with a cutting edge, a chip space in the form of a concaveness in the outer peripheral surface being arranged between the blade projections, and that the inner channel portion extends from said central part into each blade projection towards an outer tip thereof.

5. The slot milling disc according to claim 4, wherein a first outer channel portion is branched from the inner channel portion at a location within the blade projection and opens by an outlet opening into the chip space located behind the blade projection as seen in an intended rotation direction of the disc and directed towards the rake surface of the cutting edge.

6. The slot milling disc according to claim 1, wherein the second outer channel portion extends to an outlet opening in the tip of the blade projection in the vicinity of and behind the cutting edge of the blade projection as seen in the intended rotation direction of the disc.

7. The slot milling disc according to claim 1, wherein the inlet opening comprises at least one elongated opening.

8. The slot milling disc according to claim 7, wherein the elongated opening is arch shaped.

9. The slot milling disc according to claim 8, wherein each elongated arch shaped inlet opening has a centre of curvature concentric with a centre axis of the disc.

10. The slot milling disc according to claim 7, wherein two or more flushing fluid channels extend from a common, elongated inlet opening.

11. The slot milling disc according to claim 1, wherein the cutting edges are arranged to cut a slot in a work piece with a width of 1.5-8 mm.

12. The slot milling disc according to claim 1, wherein the disc has a first side surface having a bearing surface around a centre axis of the disc and a second side surface opposite to the first side surface, the attachment arrangement being configured to interact with mating attachment means of a rotatable mounting shaft while forcing the bearing surface towards a mounting surface at an end surface of the shaft, and that the milling disc has the inlet opening of the at least one flushing fluid channel in its bearing surface.

13. The slot milling disc according to claim 1, wherein the attachment arrangement is a fixed connection between the disc and the shaft, such as by welding or by being made in one piece therewith.

14. A slot milling tool comprising:
a slot milling disc according to claim 1; and
a rotatable mounting shaft arranged to be non-rotatably attached to the slot milling disc, the shaft including feeding openings in an end surface thereof in fluid communication with a fluid channel within the shaft and which are shaped and positioned to allow feeding of flushing fluid from the fluid channel to the inlet openings of the slot milling disc.

15. A disc for a slot milling disc provided with a number of seats for receiving cutting inserts at an outer peripheral surface of the disc, wherein, in a state of use, the disc is arranged to form a slot milling disc according to claim 1 by receiving cutting inserts in the seats.

* * * * *